United States Patent [19]

Ido et al.

[11] Patent Number: 5,724,462
[45] Date of Patent: Mar. 3, 1998

[54] INTEGRATED OPTICAL SEMICONDUCTOR DEVICE AND OPTICAL GYROSCOPE USINNG THE SAME

[75] Inventors: Tatemi Ido, Hachioji; Shigehisa Tanaka, Kunitachi; Ryoji Suzuki, Mito; Toshiya Yuhara, Hitachi, all of Japan

[73] Assignees: Hitachi, Ltd.; Hitachi Cable, Ltd., both of Tokyo, Japan

[21] Appl. No.: 633,305

[22] Filed: Apr. 15, 1996

[30] Foreign Application Priority Data

Apr. 20, 1995 [JP] Japan .................. 7-094762

[51] Int. Cl.$^6$ ............................... G02B 6/12
[52] U.S. Cl. ............... 385/14; 385/3; 385/4; 385/9; 385/40
[58] Field of Search ............... 385/14, 3, 4, 9, 385/24, 40, 41, 129, 130; 359/152, 173; 437/105, 107, 129; 356/345, 350

[56] References Cited

U.S. PATENT DOCUMENTS 5,334,551 8/1994 Komatsu .................. 385/129 X
5,522,005 5/1996 Moretti et al. .............. 385/14 X

*Primary Examiner*—Phan T. H. Palmer
*Attorney, Agent, or Firm*—Antonelli, Terry, Stout & Kraus, LLP

[57] ABSTRACT

An integrated optical semiconductor device and an optical fiber gyroscope using the same. The semiconductor device comprises a super luminescence diode, at least one waveguide type photo-diode and at least one Y-branch integrated on a single semiconductor substrate. The waveguide structure of the super luminescence diode, photo-diode and Y-branch shares common optical guide layers formed by concurrent crystal growth. At least part of the optical guide layers are located on the side of the semiconductor substrate away from an active layer of the super luminescence diode and an optical absorption layer of the photo-diode.

28 Claims, 6 Drawing Sheets

Fig. 1b

INTEGRATED OPTICAL SEMICONDUCTOR DEVICE AND OPTICAL GYROSCOPE USINNG THE SAME

BACKGROUND OF THE INVENTION

The present invention relates to an integrated optical semiconductor device and an optical gyroscope using the same.

The optical gyroscope is superior to other types of gyroscope in terms of sensitivity and stability. In recent years, growing expectations have been evident for the optical gyroscope to be incorporated in car navigation systems.

FIG. 5 is a block diagram of a conventional optical fiber gyroscope. With this kind of optical fiber gyroscope, a super luminescence diode (SLD) module 64 radiates light which is passing through a fiber coupler 48, polarized by a fiber polarizer 61, and divided by a fiber coupler 44 into two branches of light. The two branches of the divided light are guided to enter a polarization maintaining fiber loop 45 from two ends thereof. The transmitted light from the loop is again combined and interfered with by the fiber coupler 44 and polarized by a polarizer 61. After passing a fiber coupler 48, the interfered light is detected by a photo-diode (PD) 65. A phase modulator 46 is provided to adjust the phase relation between the two branches of the divided light. When the optical gyroscope rotates, a difference of frequency develops between the clockwise- and the counterclockwise-rotating light branches through the fiber loop 45 (due to the Sagnac effect). The difference of frequency triggers changes in the intensity of interference light between the two branches of light. Such changes are detected by the photo-diode (PD) 65. The SLD module 64 has a SLD chip 62, a lens 43, and an optical output monitoring PD 63 that keeps optical output constant. A control circuit 47 controls the SLD emission power and converts the PD signal to angular velocity. This optical fiber gyroscope uses an SLD having a short wavelength region of 0.8 µm for sensitivity reasons.

One disadvantage of the conventional optical fiber gyroscope above is that it is costly and difficult to mass-produce because a large number of parts need to be assembled in many steps. That is, the gyroscope has a plurality of semiconductor elements such as the SLD and PDs furnished in modular form and these modules, together with couplers and phase modulators, need to be spliced before the assembly is complete.

If SLDs, PDs, Y-branches and polarizers were integrated monolithically to constitute an integrated optical semiconductor device on a single semiconductor substrate, that would mean considerable savings in the number of parts and the number of assembling steps involved. To implement such a device requires technology for forming on the same substrate optical waveguides with different band gaps and for connecting these waveguides in a stable, loss-free manner. Such technology has been relatively well-developed for long wavelength region-oriented devices with InP used as the substrate. However, an optical gyroscope based on an integrated optical semiconductor device for long wavelength regions offers only low levels of sensitivity and has a deteriorated temperature dependence of luminescence. This results in a degraded temperature characteristic of the gyroscope.

In addition, it is difficult to implement and integrate polarizers using semiconductor waveguides. Illustratively, even if optical elements other than the polarizers are integrated, the benefit of savings in the number of necessary parts and assembling steps is limited, which reduces the reward of optical device integration.

SUMMARY OF THE INVENTION

It is therefore an object of the present invention to provide an integrated optical semiconductor device for use with an optical gyroscope.

It is another object of the present invention to provide an integrated optical semiconductor device for allowing an optical gyroscope to operate without polarizers.

In achieving the foregoing objects of the present invention and according to one aspect thereof, there is provided an integrated optical semiconductor device comprising a clad layer, a guide layer, a compressively strained quantum well active layer and a re-grown layer grown in that order on a semiconductor substrate. The re-grown layer and the compressively strained quantum well active layer are then removed except from regions destined to be a super luminescence diode (SLD) and photo-diodes (PDs), and a clad layer and a contact layer are again grown over the entire substrate. Finally, optical waveguides are formed by etching or by similar means so as to furnish the SLD and PDs with electrodes.

FIGS. 1A, 1B, 1C and 1D are schematic views showing the constitution of an integrated optical semiconductor device practiced as a first embodiment of the invention for use with an optical gyroscope. The effects of the invention will now be outlined with reference to FIGS. 1A, 1B, 1C and 1D. On a GaAs substrate 11, an epitaxial growth is made of an AlGaAs clad layer 12, an AlGaAs guide layer 13, a GaAs guide layer 14, an InGaAs/GaAs compressively strained quantum well active layer 15 and a GaAs re-grown layer 16. The GaAs re-grown layer 16 and InGaAs/GaAs compressively strained quantum well active layer 15 are then removed except from regions destined to be the SLD an PDs. The entire substrate surface is again covered with a growth of an AlGaAs guide layer 17, an AlGaAs clad layer 18 and a GaAs contact layer 19. Constituted in this manner, the integrated optical semiconductor device allows the light (with a wavelength of about 1 µm) emitted by the InGaAs/GaAs compressively strained quantum well active layer 15 of the SLD to propagate through the optical waveguides and Y-branches other than the SLD and PDs without being absorbed. Meanwhile, the InGaAs/GaAs compressively strained quantum well active layer 15 acts as an absorption layer for the PDs. The stagger on the substrate at the time of re-growth is as small as 0.1 µm, and the re-growth occurs all over the substrate. This means the absence of an anomalous growth leading to coupling losses of waveguides between regions. The SLD and PDs primarily constitute an optical waveguide structure that confines light within the guide layers. This minimizes coupling losses at the connections with the other optical waveguides (Y-branches) sharing the same guide layers.

FIG. 2 is a block diagram of an optical fiber gyroscope constituted by use of the integrated optical semiconductor device of FIG. 1. FIGS. 6A and 6B are graphic representations showing how the luminescence and absorption of the InGaAs/GaAs compressively strained quantum well active layer of the invention are typically dependent on polarization and wavelengths. Outlined below with reference to FIGS. 6A and 6B is why polarizers are unnecessary for the optical fiber gyroscope based on the integrated optical semiconductor device according to the invention. In the compressively strained quantum well active layer, a bi-axis strain makes the band gap energy between heavy-hole band and conduction band smaller than that between light-hole band and conduction band. Almost all injected carriers thus recombine between heavy-hole band and electron band to emit luminescence. The luminescence from the carrier recombination between heavy-hole band and conduction band represents transverse electrical polarization. This allows light to be sufficiently polarized in a transverse electrical polarization mode without the use of polarizers.

Meanwhile, the intensity of optical absorption of the same compressively strained quantum well active layer takes large values only with respect to the transverse electrical polarized light at band edges (FIGS. 6A and 6B). The sensitivity of waveguide type photo-diodes having the compressively strained quantum well active layer as their absorption layer is thus significantly dependent on polarization with respect to the light having wavelengths near the band edges, i.e., regarding the luminescence emitted by quantum well layers of the same structure. In the conventional optical fiber gyroscope (FIG. 5), polarized crosstalk produced by the optical fiber coupler or the like is removed by having it again pass through a fiber type polarizer 61. With the optical gyroscope (FIG. 2) that uses the integrated optical semiconductor device of the invention, the above-described dependency of the sensitivity of the PD(II) on polarization is exploited so as to remove polarization crosstalk.

The availability of transverse electrical polarization without the use of polarizers and the dependency of PD sensitivity on polarization being exploited to remove polarization crosstalk are two reasons why optical fiber gyroscopes based on the inventive integrated optical semiconductor device are constituted advantageously without the use of the hitherto-indispensable polarizers.

Other objects, features and advantages of the present invention will become apparent in the following specification and accompanying drawings.

DETAILED DESCRIPTION OF THE PREFERRED EMBODIMENTS

Preferred embodiments of the invention will now be described with reference to the accompanying drawings.

(First Embodiment)

Figure 1A:
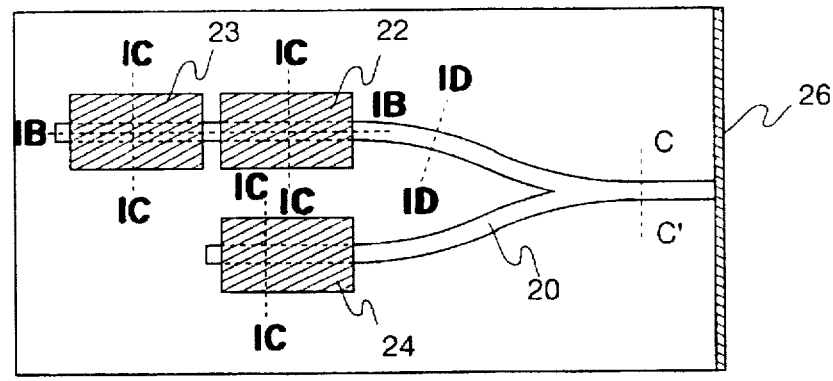
FIGS. 1A, 1B, 1C and 1D are schematic views showing the constitution of an integrated optical semiconductor device practiced as a first embodiment of the invention for use with an optical gyroscope.
Figure 1B:
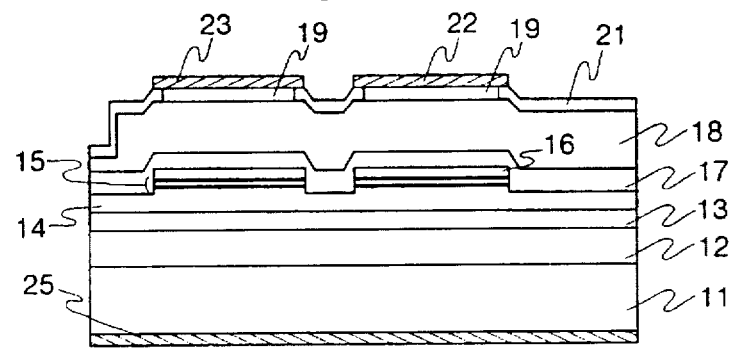
Figure 1C:
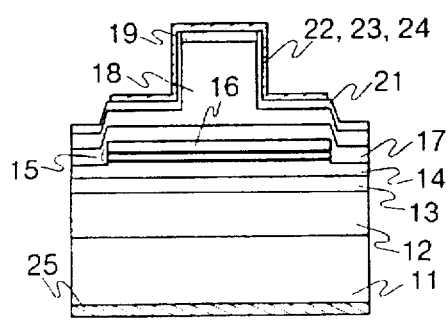
Figure 1D:
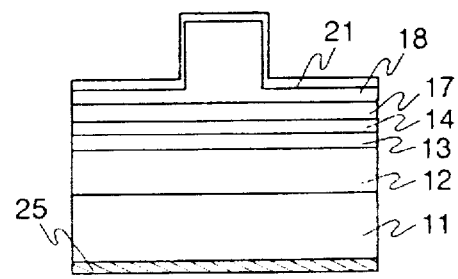

FIG. 1A is a plan view of the integrated optical semiconductor device practiced as the first embodiment of the invention for use with an optical gyroscope. FIGS. 1B, 1C and 1D are cross-sectional views taken on lines 1B—1B, 1C—1C and 1D—1D, respectively, in FIG. 1A.

An n-$Al_{0.4}Ga_{0.5}As$ clad layer (1.5 μm thick) 12, an $Al_{0.2}Ga_{0.8}As$ guide layer (0.05 μm thick) 13, a GaAs guide layer (0.10 μm thick) 14, an $In_{0.2}Ga_{0.8}As$/GaAs compressively strained quantum well active layer 15 (having two 7-nm-thick wells), and a GaAs re-grown layer (0.05 μm) 16 are grown by the MBE (molecular beam epitaxy) method on an n-GaAs substrate 11. The GaAs re-grown layer 16 and compressively strained quantum well active layer 15 thus grown are removed by etching except from regions destined to become an SLD (super luminescence diode) and PDs (photo-diodes). The MBE method is again used to grow an $Al_{0.2}Ga_{0.8}As$ guide layer (0.05 μm thick) 17, a p-$Al_{0.4}Ga_{0.6}As$ clad layer (1.5 μm thick) 18 and a p-GaAs contact layer (0.2 μm thick) 19 all over the substrate 11. Thereafter, the substrate 11 is etched so as to form optical waveguides 20. After passivation is carried out with an $SiO_2$ layer 21, the SLD and two PDs are furnished with p-electrodes 22, 23 and 24. Finally, an n-electrode 25 is deposited by evaporation. The device is cut out by cleavage and its optical input/output edge surface is provided with an anti-reflection film 26. The SLD and PD regions are 500 μm long each.

In experiments conducted by the inventors, a driving current applied to the SLD of the semiconductor device thus fabricated produced super luminescence (with a wavelength of 1.0 μm) from the waveguide edge of the device. The output of the luminescence was 3 mW when a current of 40 mA was applied. The transverse electrical component of the output luminescence was greater than its transverse magnetic component by 20 dB or more, whereby polarization of the output luminescence was ascertained. At this point, it was verified that a photoelectric current proportional to the intensity of the output luminescence flowed through the electrode 23 of the PD(I), the PD(I) thus functioning as an output luminescence monitor. When polarized light with a wavelength of 1.0 μm was made to enter the semiconductor waveguide edge, a photoelectric current proportional to the intensity of the incident light flowed through the electrode 24 of the PD(II). The photoelectric current was the largest when the incident light was transverse electrical polarized light; the current was small when the incident light was transverse magnetic polarized light. (The sensitivity of the PD receiving the transverse magnetic polarized light was lower by 20 dB than the PD sensitivity upon receipt of the transverse electrical polarized light.)

Figure 2:
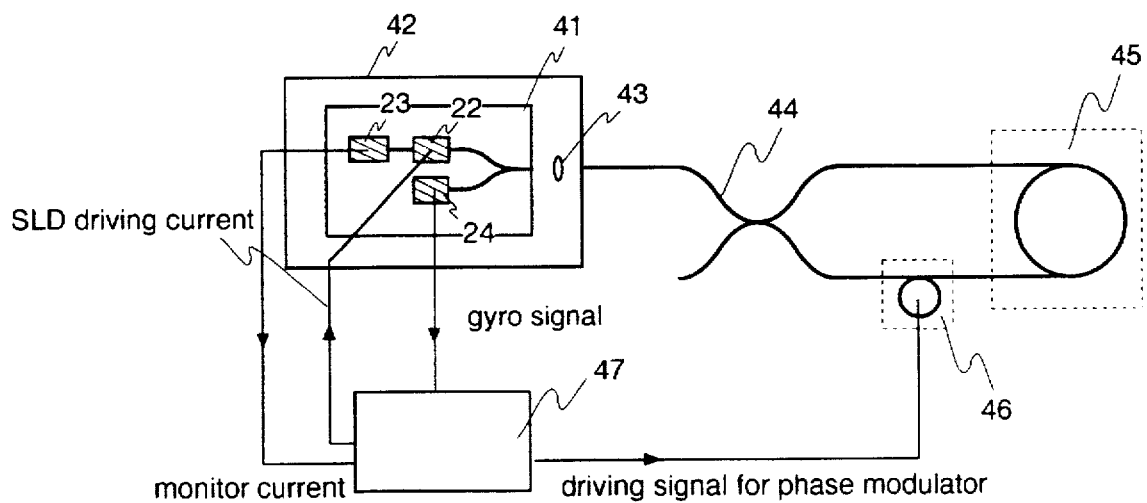
FIG. 2 is a block diagram of an optical fiber gyroscope constituted by use of the first embodiment of the invention.
Figure 5:
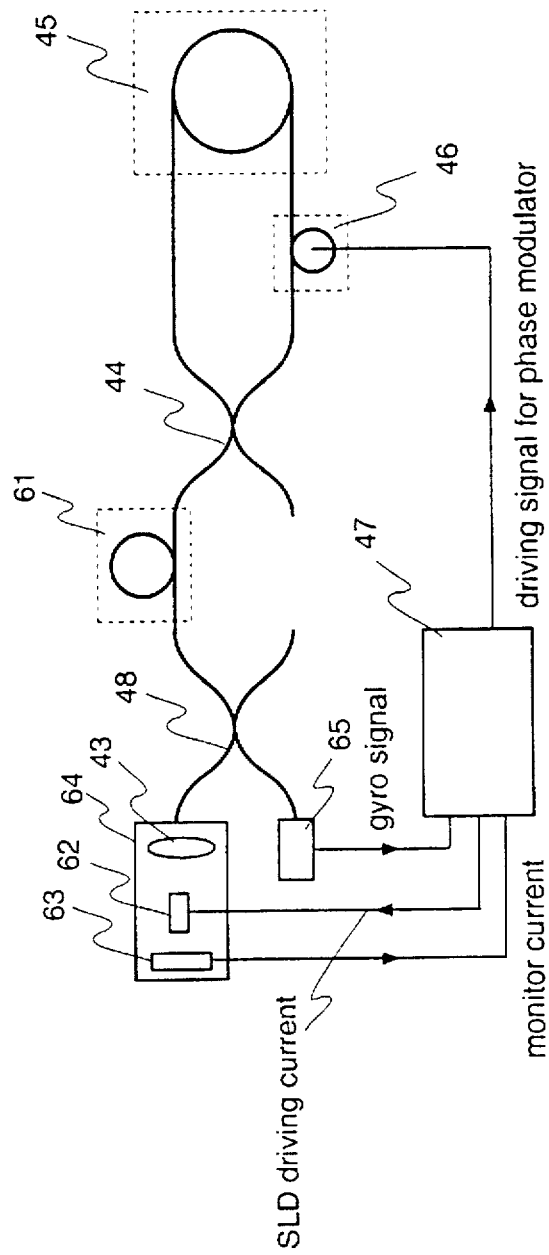
FIG. 5 is a block diagram of a conventional optical fiber gyroscope.
Figure 6A:
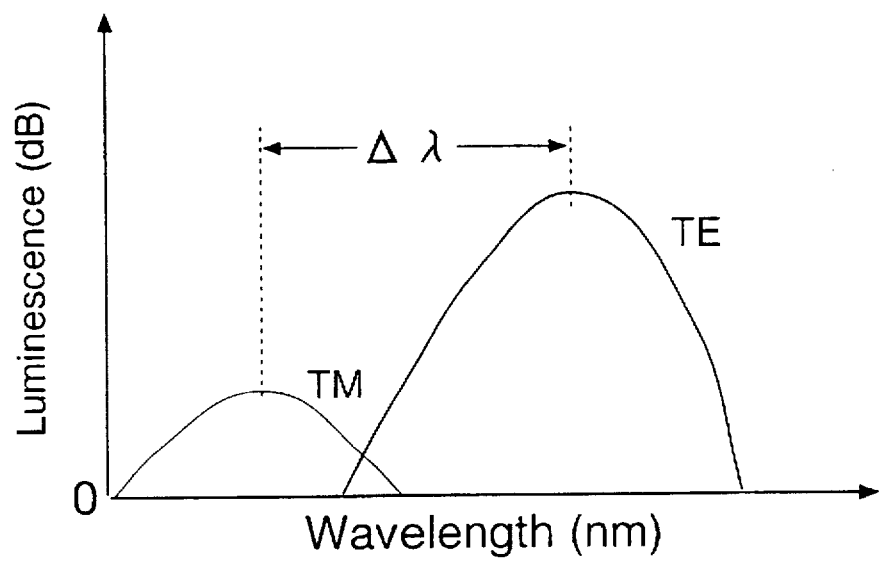
FIGS. 6A and 6B are graphic representations depicting how the luminescence and absorption of the compressively strained quantum well active layer of the invention are typically dependent on polarization and wavelengths.
Figure 6B:
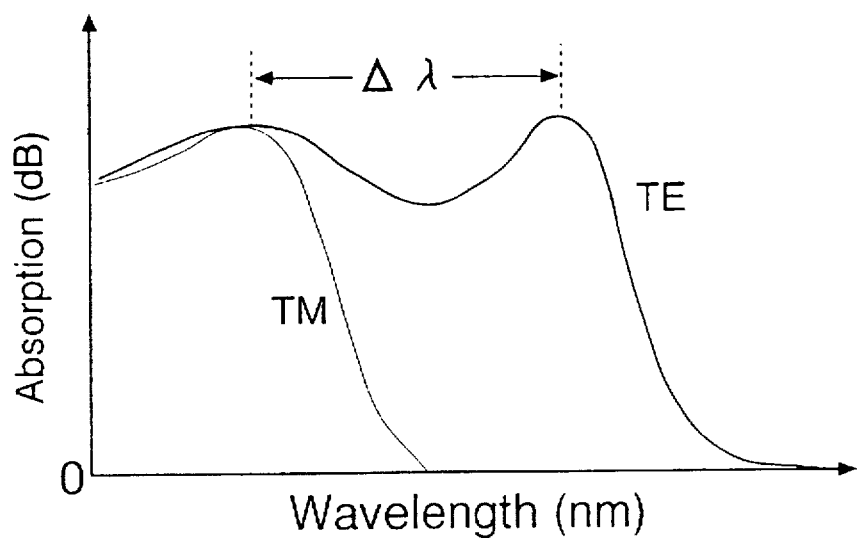

An optical module 42 was made of the integrated optical semiconductor device 41 thus fabricated using a lens 43 for optical coupling between the device and the fiber, and an optical fiber gyroscope was constructed by use of that optical module (FIG. 2). In this optical fiber gyroscope, an optical fiber coupler 44 divides into two branches the polarized light coming from the SLD of the integrated optical semiconductor device. The two branches of light are led to enter a polarization plane maintaining fiber loop 45 from both ends thereof. The light that transited the loop is again interfered with and combined by the same optical fiber coupler. The combined light is branched by a Y-branch of the integrated optical semiconductor device. The intensity of the branched light is measured by the PD(II) that detects an angular velocity therefrom. The photoelectric current flowing through the PD(I) is monitored so as to keep the luminescence intensity of the SLD constant. In experiments conducted by the inventors, the characteristics of the optical fiber gyroscope of the above-described constitution were evaluated to be as high as those of the conventional optical fiber gyroscope (FIG. 5).

(Second Embodiment)

Figure 3A:
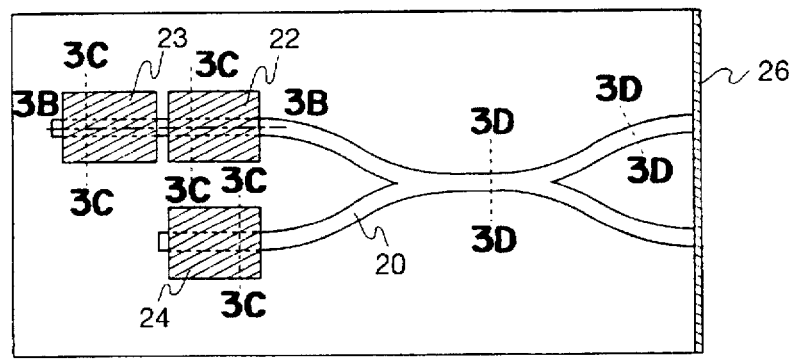
FIGS. 3A, 3B, 3C and 3D are schematic views showing the constitution of an integrated optical semiconductor device practiced as a second embodiment of the invention for use with an optical gyroscope.
Figure 3B:
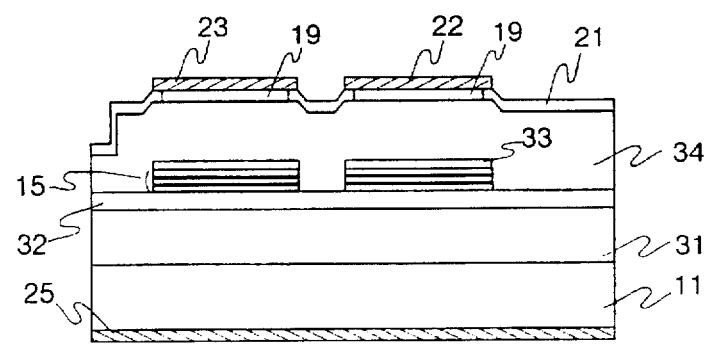
Figure 3C:
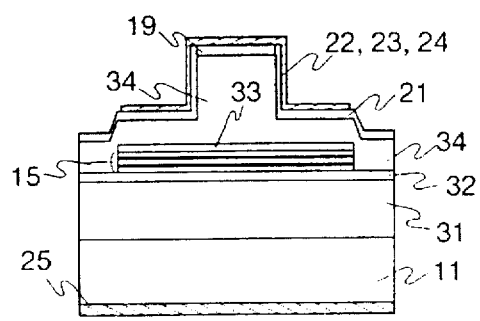
Figure 3D:
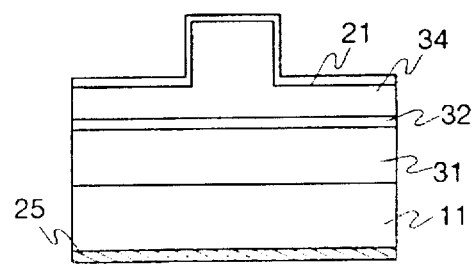

FIG. 3A is a plan view of the integrated optical semiconductor device practiced as the second embodiment of the invention for use with an optical gyroscope. FIGS. 3B, 3C and 3D are cross-sectional views taken on lines 3B—3B, 3C—3C, and 3D—3D, respectively, in FIG. 3A.

An n-$In_{0.5}Ga_{0.5}P$ clad layer (1.5 μm thick) 31, an InGaAsP guide layer (0.15 μm thick, with a band gap wavelength of 0.8 μm) 32, an $In_{0.2}Ga_{0.8}As$/GaAs compressively strained quantum well active layer 15 (having a well width of 7 nm and a frequency of 2) and an InGaAsP re-grown layer (0.05 μm thick) 33 are grown successively on an n-GaAs substrate 11 by the MOCVD (metal organic chemical vapor deposition) method. The InGaAsP re-grown layer 33 and compressively strained quantum well active layer 15 thus grown are removed by selective etching except from regions destined to become an SLD (super luminescence diode) and PDs (photo-diodes). The MOCVD method is again used to grow a p-$In_{0.5}Ga_{0.5}P$ clad layer (1.5 μm thick) 34 and a p-GaAs contact layer (0.2μ thick) 19 all over the substrate 11. Thereafter, the wafer is etched so as to form optical waveguides 20. After passivation is carried out with an $SiO_2$ layer 21, the SLD and two PDs are furnished with p-electrodes 22, 23 and 24. Finally, an n-electrode 25 is deposited by evaporation. The device is cut out by cleavage and its optical input/output edge surface is provided with an anti-reflection film 26. The SLD and PD regions are 500 μm long each.

In experiments conducted by the inventors, a driving current applied to the SLD of the semiconductor device thus fabricated produced super luminescence (with a wavelength of 1.0 μm) from the waveguide edge of the device. The output of the luminescence was 3 mW when a current of 40 mA was applied. The transverse electrical component of the output luminescence was greater than its transverse magnetic component by 20 dB. At this point, it was verified that a photoelectric current proportional to the intensity of the output luminescence flowed through the electrode 23 of the PD(I), the PD(I) thus functioning as an output luminescence monitor. When polarized light with a wavelength of 1.0 μm was made to enter the waveguide edge, a photoelectric current proportional to the intensity of the incident light flowed through the electrode 24 of the PD(II). The photoelectric current was the largest when the incident light was transverse electrical polarized light. The sensitivity of the PD receiving the transverse magnetic polarized light was lower by 20 dB than the PD sensitivity upon receipt of the transverse electrical polarized light.

Figure 4:
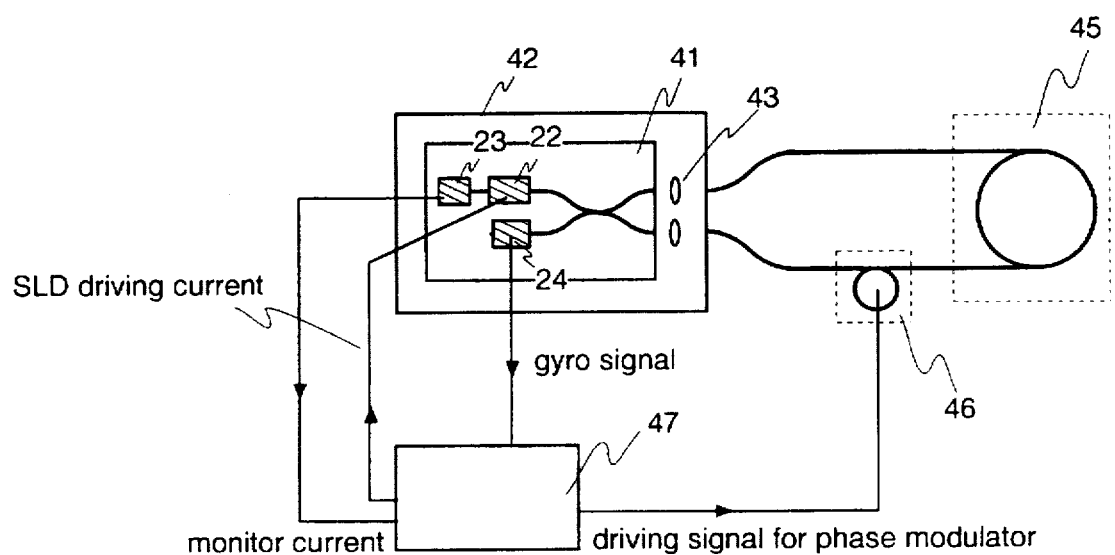
FIG. 4 is a block diagram of an optical fiber gyroscope constituted by use of an integrated optical semiconductor device practiced as the second embodiment of the invention.

An optical module was also made of the integrated optical semiconductor device thus fabricated, and an optical fiber gyroscope was constructed by use of that optical fiber module. The constitution of the optical gyroscope is illustrated in FIG. 4. This optical fiber gyroscope is the same in constitution as that of the first embodiment except that the optical fiber coupler in the first embodiment is replaced by a Y-branch in the integrated optical semiconductor device practiced as the second embodiment. In experiments conducted by the inventors, the characteristics of the optical fiber gyroscope of the above-constitution were also evaluated to be as high as those of the conventional optical fiber gyroscope.

The embodiments above specifically utilize the InGaAs/GaAs compressively strained quantum well layer as their active and absorption layer. However, this is not limitative of the invention. The invention is also implemented by use of a compressively strained quantum well layer composed of a mixture of other semiconductor crystals (e.g., InGaAlAs/GaAs, InGaAsP/GaAs, InGaAsP/InGaAsP, InGaAlAs/AlGaAs).

As described, the invention makes it easy to fabricate an integrated optical semiconductor device on a semiconductor substrate comprising a super luminescence diode for outputting luminescence with a high degree of polarization, photo-diodes with a high dependency on polarization for their sensitivity, and Y-branches. Where the integrated optical semiconductor device of the invention is used to construct an optical gyroscope, a significantly smaller number of parts are needed than before to complete the gyroscope which is smaller in size and much less expensive to fabricate.

What is claimed is:

1. An integrated optical semiconductor device comprising a super luminescence diode, at least one waveguide type photo-diode and at least one Y-branch integrated on a single semiconductor substrate;

wherein the waveguide structure of said super luminescence diode, said photo-diode and said Y-branch shares common optical guide layers formed by concurrent crystal growth; and wherein at least part of said optical guide layers are located on the side of said semiconductor substrate away from an active layer of said super luminescence diode and an optical absorption layer of said photo-diode.

2. An integrated optical semiconductor device according to claim 1, wherein the common optical guide layers are included in an MOCVD grown structure, on said substrate, comprising a clad layer, a single guide layer, a quantum well active layer and an InGaAsP re-grown layer, in that order, the quantum well active layer and the re-grown layer being limited to regions of the structure for said super luminescence diode and said photo-diode.

3. An integrated optical semiconductor device according to claim 2, wherein said substrate is formed of GaAs and has n-type conductivity, said clad layer includes an InGaP layer having n-type conductivity, said guide layer is an InGaAsP layer, said quantum well active layer includes a compressively strained quantum well active layer selected from the group consisting of InGaAs/GaAs, InGaAlAs/GaAs, InGaAsP/GaAs, InGaAsP/InGaAsP and InGaAlAs/AlGaAs, and said re-grown layer is an InGaAsP layer formed on the quantum well active layer.

4. An integrated optical semiconductor device according to claim 3, wherein said clad layer is an n-$In_{0.5}Ga_{0.5}P$ clad layer with a thickness of 1.5 μm, said InGaAsP guide layer has a thickness of 0.15 μm and a band gap wavelength of 0.8 μm, said quantum well active layer is an n-$In_{0.2}Ga_{0.8}As$/GaAs compressively strained quantum well active layer having a well width of 7 nm, and said InGaAsP re-grown layer has a thickness of 0.05 μm.

5. An optical gyroscope comprising an integrated optical semiconductor device according to claim 3.

6. An integrated optical semiconductor device according to claim 1, wherein the common optical guide layers are included in an epitaxially grown structure, on said substrate, comprising a clad layer, at least one guide layer, an $In_xGa_{1-x}As$/GaAs compressively strained quantum well active layer and a GaAs re-grown layer, in that order, the quantum well active layer and the re-grown layer being limited to regions of the structure for said super luminescence diode and said photo-diode.

7. An integrated optical semiconductor device according to claim 6, wherein said substrate is formed of GaAs, said clad layer includes an $Al_xGa_{1-x}As$ having n-type conductivity, said at least one guide layer includes an $Al_xGa_{1-x}As$ guide layer and a relatively thicker GaAs guide layer thereon, said quantum well active layer is an $In_{0.2}Ga_{0.8}As$/GaAs compressively strained quantum well active layer having two wells and said re-grown layer is a GaAs layer formed on the quantum well active layer.

8. An optical gyroscope comprising an integrated optical semiconductor device according to claim 7.

9. An integrated optical semiconductor device according to claim 6, wherein said clad layer includes an n-type $Al_{0.4}Ga_{0.6}As$ layer and the x value in said $Al_xGa_{1-x}As$ guide layer is about 0.2.

10. An integrated optical semiconductor device comprising a super luminescence diode, at least one waveguide type photo-diode and at least one Y-branch integrated on a single semiconductor substrate;

wherein an active layer of said super luminescence diode and an optical absorption layer of said photo-diode are made up of semiconductor layers formed by concurrent crystal growth and having the same composition.

11. An integrated optical semiconductor device according to claim 10, said integrated optical semiconductor device being fabricated by the steps of:

bringing about crystal growth of at least a clad layer, a guide layer, an active and absorption layer and a re-grown layer successively on said semiconductor substrate;

removing at least part of said re-grown layer and said active layer; and re-growing at least a clad layer and a contact layer all over the substrate surface.

12. An integrated optical semiconductor device according to claim 11, wherein said substrate is formed of GaAs and having n-type conductivity, said clad layer includes an InGaP layer having n-type conductivity, said guide layer is an InGaAsP layer, said active and absorption layer includes a compressively strained quantum well active layer selected from the group consisting of InGaAs/GaAs, InGaAlAs/GaAs, InGaAsP/GaAs, InGaAsP/InGaAsP and InGaAlAs/AlGaAs, and said re-grown layer is a GaAs layer formed on the quantum well active layer.

13. An integrated optical semiconductor device according to claim 12, wherein said clad layer is an n-$In_{0.5}Ga_{0.5}P$ clad layer with a thickness of 1.5 μm, said InGaAsP guide layer has a thickness of 0.15 μm and a band gap wavelength of 0.8 μm, said quantum well active layer is an n-$In_{0.2}Ga_{0.8}As$/GaAs compressively strained quantum well active layer having a well width of 7 nm, and said InGaAsP re-grown layer has a thickness of 0.05 μm.

14. An integrated optical semiconductor device according to claim 13, wherein said crystal growth is effected by MOCVD.

15. An integrated optical semiconductor device according to claim 12, wherein said crystal growth is effected by MOCVD.

16. An integrated optical semiconductor device according to claim 11, wherein said active and absorption layer includes a selection made from the group consisting of InGaAs/GaAs, InGaAlAs/GaAs, InGaAsP/GaAs, InGaAsP/InGaAsP and InGaAlAs/AlGaAs.

17. An integrated optical semiconductor device according to claim 11, wherein said substrate is formed of GaAs, said clad layer is an n-type layer, said guide layer includes an $Al_{0.2}Ga_{0.8}As$ layer and a relatively thicker GaAs layer thereon, said active and absorption layer includes a compressively strained quantum well active layer selected from the group consisting of InGaAs/GaAs, InGaAlAs/GaAs, InGaAsP/GaAs, InGaAsP/InGaAsP and InGaAlAs/AlGaAs, and said re-grown layer is a GaAs layer formed on the quantum well active layer.

18. An integrated optical semiconductor device according to claim 11, wherein said substrate is formed of GaAs, said clad layer is an n-type $Al_{0.4}Ga_{0.6}As$ layer, said guide layer includes an $Al_{0.2}Ga_{0.8}As$ layer and a relatively thicker GaAs layer thereon, said active and absorption layer includes an $In_{0.2}Ga_{0.8}As$/GaAs compressively strained quantum well active layer having two wells and said re-grown layer is a GaAs layer formed on the quantum well active layer.

19. An integrated optical semiconductor device according to claim 11, wherein said active and absorption layer includes an $In_{0.2}Ga_{0.8}As$/GaAs compressively strained quantum well active layer having two wells.

20. An integrated optical semiconductor device according to claim 11, wherein said crystal growth is effected by MBE.

21. An integrated optical semiconductor device according to claim 11, wherein said crystal growth is effected by MOCVD.

22. An integrated optical semiconductor device according to claim 2, wherein the active layer of said super luminescence diode and the optical absorption layer of said photo-diode are made up of semiconductor layers formed by concurrent crystal growth and including at least one quantum well.

23. An integrated optical semiconductor device according to claim 22, wherein said at least one quantum well includes a compressively strained quantum well active layer selected from the group consisting of InGaAs/GaAs, InGaAlAs/GaAs, InGaAsP/GaAs, InGaAsP/InGaAsP and InGaAlAs/AlGaAs.

24. An integrated optical semiconductor device according to claim 22, wherein at least part of said quantum well has a bi-axis compressive strain.

25. An integrated optical semiconductor device according to claim 22, wherein said at least one quantum well includes an $In_{0.2}Ga_{0.8}As$/GaAs compressively strained quantum well active layer.

26. An optical gyroscope comprising an integrated optical semiconductor device according to claim 1 or 10.

27. An integrated optical semiconductor device according to claim 1 or 10, wherein said semiconductor substrate is composed of GaAs.

28. An integrated optical semiconductor device according to claim 1 or 10, wherein the emission wavelength of said super luminescence diode is less than 1.1 μm.

* * * * *